United States Patent [19]

Yevick

[11] 4,378,141
[45] Mar. 29, 1983

[54] EXPOSURE PACKAGE FOR HOLOGRAPHY

[76] Inventor: George J. Yevick, 536 Nordhoff Dr., Leonia, N.J. 07605

[21] Appl. No.: 255,436

[22] Filed: Apr. 20, 1981

[51] Int. Cl.³ ............................................. G03H 1/02
[52] U.S. Cl. ................................. 350/3.61; 350/3.85; 430/1
[58] Field of Search ............... 430/1, 2; 350/3.6, 3.61, 350/3.85

[56] References Cited

U.S. PATENT DOCUMENTS 3,560,210 2/1971 Grobin, Jr. .............................. 430/1
3,810,687 5/1974 De Lang et al. ................... 350/3.85

FOREIGN PATENT DOCUMENTS 821605 10/1959 United Kingdom .
1181681 2/1970 United Kingdom .

*Primary Examiner*—Bruce Y. Arnold
*Attorney, Agent, or Firm*—Thomas J. Greer, Jr.

[57] ABSTRACT

An exposure package for holography. A transparent substrate carries a photographic emulsion layer on both surfaces thereof. After exposure the emulsion layers are developed while remaining on the transparent substrate. The use of two emulsion layers yields greater fidelity upon readout than a single layer because of the greater recording volume and because of a filtering action to inhibit optical noise resulting from the spaced apart, accurately registered phase relations recorded in and carried by the two emulsions.

3 Claims, 3 Drawing Figures

EXPOSURE PACKAGE FOR HOLOGRAPHY

This invention relates to holography and more particularly to a specific array or configuration of the photographic emulsion which is fixed by known techniques to form a hologram.

A brief recapitulation of the principles of holography applicable to this invention is as follows. For a more extensive discussion, holography is fully treated in the literature, as for example *Optical Holography*, By Collier, et al, published by Academic Press, 1971, and hereby incorporated by reference. In general, holography is an optical recording technique which makes possible the presentation of three-dimensional scenes, as viewed by the human eyes, upon readout or projection. According to one of the types of laser photography currently practiced (cf. *Optical Holography*, by Collier, et al) a source of visible coherent light, such as a laser, emits light which is split into two beams, termed a reference beam and a scene or information beam. The reference beam is projected (as by a mirror) onto a photographic emulsion sensitive to light of the wavelength employed. The scene beam is directed onto the photographic emulsion. These two beams of light, in accordance with well known principles of holography, form a three-dimensional interference pattern of those regions where they interact. By placing the emulsion at a location in these mixing regions, some of the interference patterns are recorded in the emulsion. Thereafter, the emulsion is fixed or developed by known techniques. The resultant fixed emulsion, usually mounted on a rigid substrate such as a transparent sheet of plastic or glass, is termed a hologram. For readout or retrieval of this optical information, a beam of coherent light of the same frequency as that originally employed is directed against the hologram usually in a manner similar to the recording phase. In the case of so-called Lippman-Bragg holograms, readout may be accomplished by the use of white (noncoherent) light, as is well known. the individual viewing the hologram sees a three-dimensional object. Holography is remarkable in that no lens or mirrors are required to view the image.

In a conventional optical photograph, not employing holography, a photographic emulsion is exposed to light rays reflected from an object. What is recorded in any given small spot of emulsion during the exposure time is proportional to the average total energy incident on the spot. The thickness of the photographic emulsion is relatively unimportant, especially if very high resolution recording is required as in movie film or microfilm. That is to say, the resultant fidelity or quality of the photograph, after the emulsion is fixed or developed and projected for viewing, can be hindered by too thick an emulsion. Its quality is dependent upon other factors such as: the quality of the lenses employed in both making the original photograph and in projection; in the fineness of the recording medium, e.g. AgBr grains; sharpness of focus, etc.

In optical holography, however, the thickness of the recording emulsion is significant because the interference patterns produced by the reference beam and the scene beam exist in three-dimensional space. Accordingly, in general, the greater the depth or thickness of the emulsion, the greater the fidelity or accuracy of the image when viewed. Recognizing that the greater the thickness of the emulsion in optical holography, the greater the fidelity upon readout, one might initially conjecture that fidelity could be increased to any desired degree by making the emulsion as thick as one desired. However, due to the fact that very thick emulsions are subject to cracking, shrinkage and the like, there does exist, in practice, an upper limit to the thickness of the emulsion which one may employ in optical holography.

According to the practice of this invention, the quality of images obtained upon readout in optical holography is improved by making an exposure package defined by a first photographic emulsion layer fixed on one side of a transparent optical substrate. A second photographic emulsion layer is similarly mounted on the opposite side of the optical substrate. The optical package of this invention is employed in a manner entirely analogous and entirely similar to that of conventional holography in making the original exposure. Thereafter, the optical package is developed, by conventional means, i.e., each of the two photographic emulsions is simultaneously developed and fixed, and this is done without removing them from their supporting substrate. Thereafter, the exposure package, i.e., the hologram, is read out in the same manner as conventionally done. In distinction to prior holograms, the hologram of this invention, synonymously an exposure package after development, displays a greater thickness of photographic emulsion than possible with prior holograms. Namely, the second layer of photographic emulsion yields superior fidelity and accuracy upon readout.

IN THE DRAWINGS

Figure 1:
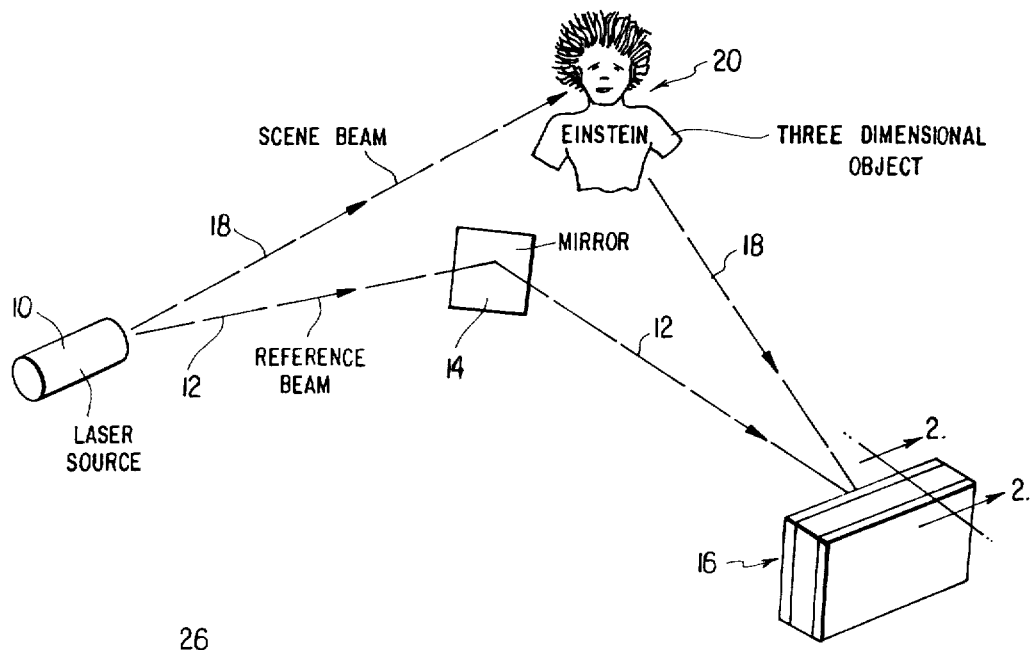
FIG. 1 is a partially schematic view illustrating a known method of practicing optical holography, the method employing the exposure package of this invention.

Referring now to the drawings, the numeral 10 denotes a source of coherent visible light, such as a laser. The laser beam from source 10 is split into two beams, a first beam 12 denoted by a reference beam which strikes a mirror 14 and is thence directed onto the exposure package 16 of this invention. The second beam from the coherent source of radiation 10 is denoted by the numeral 18 and is termed a scene beam. The scene beam strikes a three-dimensional object being photographed, i.e., recorded and is denoted by the numeral 20. A portion of the light scattered from the object falls onto the exposure package 16 of this invention, being mixed with the reference beam 12. As is well known in the art of holography, the reference beam 12 and the scene beam 18 interfere with each other along their coincident paths, such interference being recorded in the exposure package 16. Thereafter, the exposure package 16 is photographically developed by means of known techniques and the resultant developed exposure package, synonymously a hologram, is employed for readout by conventional holographic readout methods.

Figure 2:
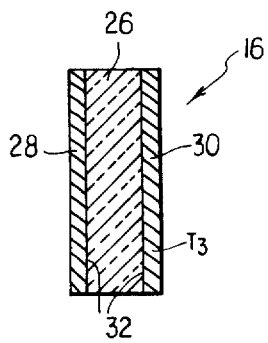
FIG. 2 is a view taken along section 2—2 of the exposure package illustrated at FIG. 1.

Referring now to FIG. 2 of the drawings the exposure package 16 is denoted by a generally planar and transparent plate 26 such as glass or a suitable plastic material, to which is adhered a first layer of photographic emulsion 28 and a second layer of photographic 30, these layers being fixed to plate 26 by a suitable bond. Many methods for adhering emulsion to substrate are well known in the photographic emulsion art.

Figure 3:
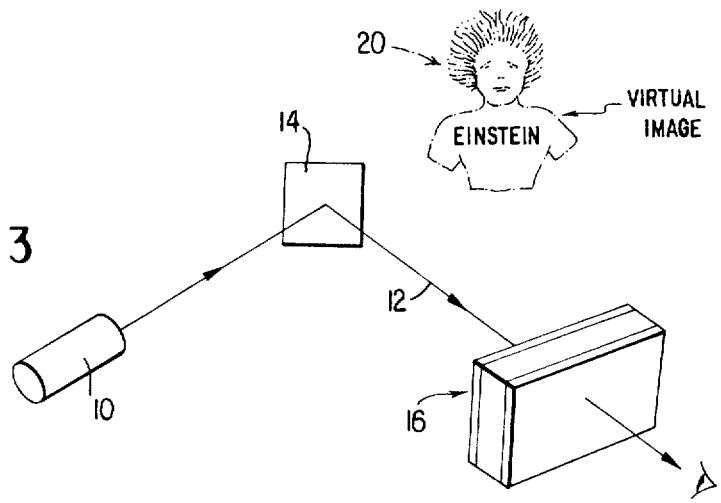
FIG. 3 is a view similar to FIG. 1, showing a known method of readout practiced with the new exposure package of this invention.

FIG. 3 illustrates a known method of readout, the human eye seeing a virtual image.

The art is aware of somewhat similar exposure package constructions. For example, U.S. Pat. No. 3,560,210 issued to Grobin discloses an exposure package defined by a pair of glass substrates which sandwich alternate layers of a soluble coating and a photographic emulsion. FIG. 3 of that patent discloses a pair of emulsion layers 22 separated by a soluble coating 24. While somewhat similar in construction, both the exposure package itself and the method of using the exposure package of Grobin are essentially different from that of this invention. In Grobin, after exposure to the coherent light, the soluble coatings between the photographic emulsion layers are dissolved, the photographic emulsions removed, then developed or fixed by conventional techniques. For readout, it appears that Grobin employs only one emulsion layer, the remaining emulsion layers being more duplicates. Thus Grobin does not contemplate the use of more than a single emulsion layer for readout, and hence his fidelity of readout is limited by the fidelity of a single emulsion layer. Further, the substrate between the emulsion layers of Grobin is a soluble coating (5, 12, 24, 42 in the several embodiments) as distinguished from the relatively rigid substrate 26 of this invention. In Grobin, the rigidity or lack thereof of the soluble coatings is not significant, since each emulsion layer is used, after development, independently of the other emulsion layer. Even if Grobin wished to, his method of emulsion fixing or development would preclude the use of two or more emulsion layers for readout. This is because of the practical impossibility of reassembling (after development) the emulsion layers in the same precise position relative to each other as they were when initial exposure was made, i.e., the problem of reregistration. This is due to the fact that fractions of the wavelengths of light are involved.

In this invention, if the emulsion layer 28 alone were read, the viewer would see (1) the phase relations recorded in 28, and (2) because of the need for the reference beam 12 for viewing, he would also see optical noise effects of the scattered beam which do not represent the desired phase relations. By using both layers 28 and 30, layer 30 functions as a kind of filter, to remove unwanted, optical noise in the reference beam. The greater the separation between 28 and 30, the greater the fidelity upon readout.

But the second or filter-like developed emulsion 30 is not a duplicate of developed emulsion 28, because, being optically downstream, i.e., at a different location in the interfering light beams when the original exposure is made, the phase relations recorded in the two emulsions are necessarily different.

The action of the two spaced emulsions is somewhat analogous to firing a bullet through two bullseye targets. If the targets are next to one another, a bullet striking the eye of the first target will naturally also strike the eye of the second target. But if the two targets are significantly spaced apart, then the task of hitting the eye of both targets is more difficult. The two spaced targets define, for a hit of both eyes, a more precise path the bullet must take.

Thus, by the practice of this invention, not only is the total volume of the emulsion increased, but also the spacing of the two emulsions increases fidelity upon readout.

I claim:

1. An exposure package for holography including a rigid substrate of generally planar form, the substrate being transparent with respect to the recording wavelength employed to make a hologram, the substrate being coated on both sides with a layer of a recording medium which is sensitive to energy of the recording wavelength employed, whereby the volume of the recording medium is increased and whereby two spaced, parallel recording layers are employed to thereby increase the fidelity upon readout of the exposure package after fixing of the coated, recording medium.

2. The exposure package of claim 1 wherein the substrate is transparent to visible light and wherein the recording medium is a photographic emulsion.

3. A method of practicing holography including the steps of exposing a pair of photosensitive emulsion layers to interfering beams of coherent light, said layers being fixed to opposite sides of a transparent, rigid substrate, fixing the resultant optical information in the two emulsions layers by photographic development, the emulsion layers remaining in the original position relative to each other during said photographic development, thereafter reading out the recorded information in a known manner, whereby the fidelity of the viewed hologram is improved by virtue of the increased volume of photograhic emulsion afforded by two emulsion layers and whereby spatial registry of the two photographic emulsion layers is maintained by developing them while they remained fixed to the transparent substrate and relative to each other, and whereby the two spaced emulsion layers after development contain different phase information to thereby improve fidelity upon readout.

* * * * *